United States Patent [19]

Halter

[11] Patent Number: 5,162,089
[45] Date of Patent: Nov. 10, 1992

[54] METHOD OF MAKING A COIL A PLASTIC FOIL OR FILM OF A THERMOPLASTIC SYNTHETIC RESIN

[75] Inventor: Hartmut Halter, Troisdorf, Fed. Rep. of Germany

[73] Assignee: Reifenhauser GmbH & Co., Troisdorf, Fed. Rep. of Germany

[21] Appl. No.: 686,824

[22] Filed: Apr. 17, 1991

[30] Foreign Application Priority Data

Apr. 27, 1990 [DE] Fed. Rep. of Germany ....... 4013612

[51] Int. Cl.$^5$ ...................... B29C 47/92; B29C 55/28
[52] U.S. Cl. .................... 264/40.1; 264/40.2; 264/211.12; 264/564; 425/141
[58] Field of Search ............... 264/40.1, 40.2, 211.12, 264/564; 425/135, 141

[56] References Cited

U.S. PATENT DOCUMENTS 4,758,390  7/1988  Henze ........................ 264/40.1

Primary Examiner—Leo B. Tentoni
Attorney, Agent, or Firm—Herbert Dubno

[57] ABSTRACT

A method of making a coil of a plastic foil forms a flat web by extrusion through a wide slit nozzle or by film blowing and determines the thickness-error profile of the foil wound on a coil. Based upon monitoring the contour of the coil the inverse thickness-error profile is produced by control of the die gap and wound on the coil so that the coil is built-up alternatingly with the original thickness-error profile and the inverse thickness-error profile until completion of winding so that it has a sufficiently cylindrical coil contour.

2 Claims, 4 Drawing Sheets

5,162,089

METHOD OF MAKING A COIL A PLASTIC FOIL OR FILM OF A THERMOPLASTIC SYNTHETIC RESIN

CROSS REFERENCE TO RELATED APPLICATION

This application is related to the commonly assigned copending application Ser. No. 07/688,927 filed Apr. 17, 1991 and corresponding to German application P 40 13 611.6 filed Apr. 27, 1990.

FIELD OF THE INVENTION

My present invention relates to a method of making a plastic film or foil of thermoplastic synthetic resin and to the winding of this foil into a coil.

The invention relates, moreover, to the formation of a coil or roll in which the cylindrical contour or cross section is maintained over the entire length of the coil so that the coil, upon completion, will conform as much as possible to the configuration of a right circular cylinder.

BACKGROUND OF THE INVENTION

Because in different countries the term "foil" and the term "film" are used to mean a web of plastic material which may be made by so-called film blowing or wide-slot nozzle extrusion, the terms are used here interchangeably.

It is known that in the production of plastic foils or film which can be wound to form a coil, thickness-error profiles can be detected for the foil across the width of which systematic plus thickness errors and minus thickness errors can be discerned.

The term "systematic" is here used to refer to errors in the thickness of the foil that arise as a function of some property of the foil-fabricating system. Such errors can develop in association with certain parts of the manufacturing system and, consequently, when a foil having such systematic errors is wound in a coil, the plus thickness errors, i.e. the thicknesses greater than the desired or setpoint value of the foil thickness, tend to accumulate in the coil to form annular bulges therein. Conversely, minus thickness errors or thickness deviations from the standard or setpoint value which are such that the thickness in a particular region is less than the setpoint value, can accumulate to form annular troughs in the coil. The system-determined thickness errors may result, for example, from tool or extrusion die tolerances or temperature differences of the extruded thermoplastic at various regions.

Such systematic thickness errors are largely unavoidable and appear in the cross section profile of the foil produced and, in a stationary state of the apparatus for producing the plastic foil, always arise at the same location across the width of the foil. If efforts are not made to avoid the build up of troughs and bulges in the coil, as described, the coil or roll has a barrel shape with annular bulges and troughs which makes the coil difficult to handle.

It has been proposed to prevent the addition of thickness errors as the foil is wound into a coil by shifting the thickness-error profile across the width of the foil and thereby substituting an error distribution for the conventional error addition. As a result, the coil can be free from error addition and thus from the bulges or troughs.

In the production of so-called blown film, in which a thermoplastified tube is generated by extruding the thermoplastified synthetic resin through an annular nozzle, the tube is then blown to form a balloon or bubble and the balloon is flattened to form a web which is wound into the coil with or without edge slitting to separate the layers of the flattened tube, either the blowing head with the extrusion tool or die must be given an angular periodic oscillating movement or the so-called flattening device must be correspondingly periodically moved. In some cases, both the blowing head and die and the flattening unit are angularly oscillated to distribute the thickness-error profiles.

These expedients have been found to involve high capital, maintenance and operating costs and thus are expensive. Furthermore, they do not always achieve the desired effect since the coil is frequently found to have irregularities even though the aforementioned bulges might not be discernible in the coil.

Another method of making such foils is to extrude the thermoplastic synthetic resin from a so-called wide slit nozzle or wide-mouth nozzle, the flat or planar foil emerging from between lips of a slot extending the width of the web and forming the nozzle or die. The thickness errors can be measured and the lips of the die adjusted to vary the extrusion gap and thereby reduce the magnitude of such errors. Such systems have been found to be costly from the measuring technology point of view. The super-position and distribution of singular thickness errors is also known, but earlier systems of this type merely reduce the thickness tolerances and do not completely eliminate the effect of thickness error addition in the coil arising from the thickness-error profile of the web.

OBJECTS OF THE INVENTION

It is, therefore, the principal object of the present invention to provide an improved method of finding coils of plastic film or foil which has, to the greatest possible extent, a truly cylindrical contour while avoiding drawbacks of earlier systems.

Another object of this invention is to provide a method of making a plastic foil and winding that foil into a coil or roll so that the coil will be free from bulges and troughs or, stated otherwise, will have a very precise cylindrical contour at the end of the winding operation.

Yet another object of the invention is to provide a method for the purposes described which will be free from the prior art drawbacks outlined above.

Still another object of my invention is to provide an improved method for the purposes described which can be carried out with greatly simplified apparatus and measuring instrumentation.

SUMMARY OF THE INVENTION

These objects and others which will become apparent hereinafter are attained, in accordance with the invention, in a method of producing a synthetic resin foil or film of a thermoplastic material and for winding the foil or film into a coil in which the plastic foil or film has a thickness-error profile with systematic plus thickness errors and minus thickness errors as these have been described above. The thickness-error profile of the fabricated coil or film is determined and the coil is wound from the foil so as to be practically free from the addition of the thickness errors.

According to the invention this is achieved in that a number n of layers with the systematic plus thickness errors and/or minus thickness errors is wound onto the coil where n=1 or n is greater than 1 (i.e. n is at least equal to 1). Thereafter and with a correspondingly programmed computer, an inverse thickness-error profile is generated and the foil with this inverse thickness-error profile is produced and a number of layers of the foil with the inverse thickness-error profile are wound on the coil, the process being continued alternately with application of layers of the one thickness-error profile or the inverse thickness-error profile until the end of the winding of the coil, i.e. until the winding of the coil has been completed. According to the invention, moreover, the development of the inverse thickness-error profile and the production and winding of the foil with this inverse thickness-error profile is effected by and in response to monitoring of the coil contour. Specifically, the thickness-error profile can be determined by monitoring the coil contour although it is possible to establish the thickness profile of the foil by a separate measurement on the web before it is wound on the coil.

The method of making a coil of a plastic foil according to the invention thus may comprise the steps of:

(a) continuously forming a flat web of a plastic foil having over a width thereof a thickness-error profile including system-produced plus thickness errors and minus thickness errors;

(b) winding the web into a coil;

(c) measuring the thickness-error profile and feeding a signal representing the thickness-error profile into a computer;

(d) upon winding of n layers of the web onto the coil, where n is at least 1, controlling the forming of the web to generate therein an inverse thickness-error profile and winding same upon the coil in n layers;

(e) alternatingly winding the coil With n layers of mutually inverse thickness-error profiles;

(f) measuring a contour of the coil as the web is wound thereon and upon deviation of the contour from the predetermined contour, initiating a winding of the coil with web of an inverse thickness-error profile, the method continuing until the coil is fully wound and has a substantially cylindrical configuration.

In accordance with a further feature of the invention, the measurement of the contour of the coil resulting from the winding of the foil or film is effected by means of scanning with a laser beam or beams. In this manner, I am able to measure the coil contour with a high degree of precision and discern the thickness profile contributed by a single layer if necessary. The contour of the coil or of the layer wound onto the coil can thus be ascertained by laser beam monitoring. It is also possible, in accordance with the invention to measure the contour of the coil wound from the foil by a mechanical sensing.

Operating in accordance with the invention, it is possible to first generate the inverse thickness-error profile as an error compensating foil when the contour of the coil measurably deviates from the desired cylindrical contour, i.e. when annular bulges or troughs are first discerned in the contour of the coil. The measured values which can be thus detected can be comparatively large relative to the thickness errors in the foil itself and thus are relatively easily measured. From the point of view of control technology, this contributes a certain time lag before correction ensues. Surprisingly, however, this does not pose a problem since the winding is so carried out that at the end of the winding process the coil will have a sufficiently precise cylindrical contour.

The measured contour can be ascertained using techniques recognized in a modern measurement technology without difficulty. The detected contour can be fed to a computer which is so programmed that it will generate the inverse thickness-error profile. The number n of layers with which the inverse profile must be wound can be detected by counting the number of turns of the prior foil winding. This number is independent of the absolute thickness of the foil. The computer can also adjust for the increase in the length of the individual layers in the winding of the coil from layer to layer.

It is not necessary for the inverse thickness-error profile to have exactly the same amplitude as the thickness errors as the original thickness-error profile. Different amplitudes are permissible and can permit the number n of turns of the original thickness-error profile and the inverse thickness-error profile to be different compensatorily.

The inverse thickness-error profile can be established by varying the width of the gap of the die in response to the computer output. Systems for varying gap width are described, for example, in German Patent Document DE 34 27 915 (U.S. Pat. No. 4,594,063) and DE 35 30 383 (U.S. Pat. No. 4,721,447).

Best results are obtained, in accordance with the invention when the last layers of the plastic foil wound onto the coil have thickness-error profiles which are the inverse of the first turns of the foil on the coil. In addition, the number n of layers of the inverse thickness-error profile at each step may equal the number n of layers of the original thickness-error profile and the inverse thickness-error profile should have, in this case, the same amplitudes as the original thickness-error profile. As noted, the invention allows for the combination of a contour measurement of the coil with a thickness measurement of the foil prior to winding it on the coil. This permits different weightings to be given to the two measurements in the computer.

The invention does not require an error distribution in the sense of earlier techniques and thus allows operation with a stationary die from which the foil is indirectly derived or directly extruded. There is no need for a rotation of the blowing head in a film blowing apparatus. In the embodiment in which the film is blown, i.e. wherein a foil in which a tube is generated and is blown to form a bubble or balloon which is flattened, the film after flattening in a stationary flattening device being directly wound onto the coil or being slit along its edges before being so wound.

When the foil or film is generated by a wide slit nozzle, the flat foil which thus results is wound directly onto the coil. All need for oscillatory or movable devices to distribute the errors is eliminated and from the apparatus point of view, the systems are greatly simplified.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
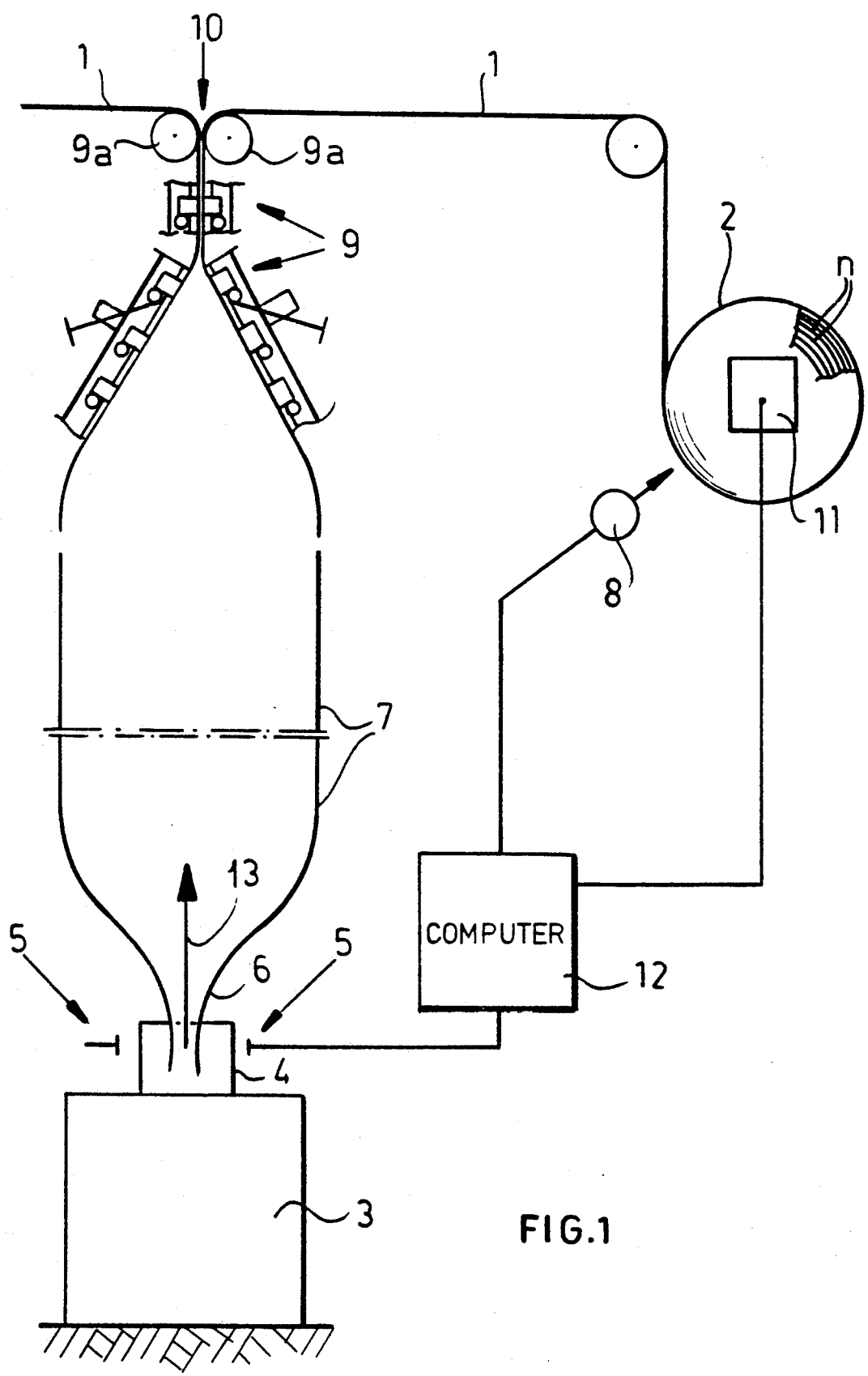
FIG. 1 is a diagrammatic elevational view of an apparatus for carrying out the method of the invention.

The apparatus shown in FIG. 1 produces a blown film 1 which is wound into a coil 2. The apparatus comprises an extruder 3 having a blowing head 4, from an annular orifice from which a tube 6 is extruded which is blown by air represented at 13 into a foil balloon or bubble 7.

The foil balloon is flattened by a flattening unit represented at 9 and the flat foil passes between rolls 9a. It can be slit along its edges by a slitting device diagrammatically represented by the arrow 10 so that two film layers 1 extend in opposite directions from the rolls 9a to respective coils, only one of which has been shown at 2 in FIG. 1.

The coiling device 2 has a measuring unit 11 which permits the number of revolutions of the coil to be determined. Juxtaposed with the coil 2 is a contour measuring unit 8 which operates with a laser beam scan of the coil 2.

The measured values from the sensors 8 and 11 respectively determining the coil profile and the number of foil layers n which are deposited are fed to the computer 12 which controls a gap-adjusting unit represented at 5 for varying the width of the gap from which the thermoplastic emerges to form the tube 6.

Figure 2:
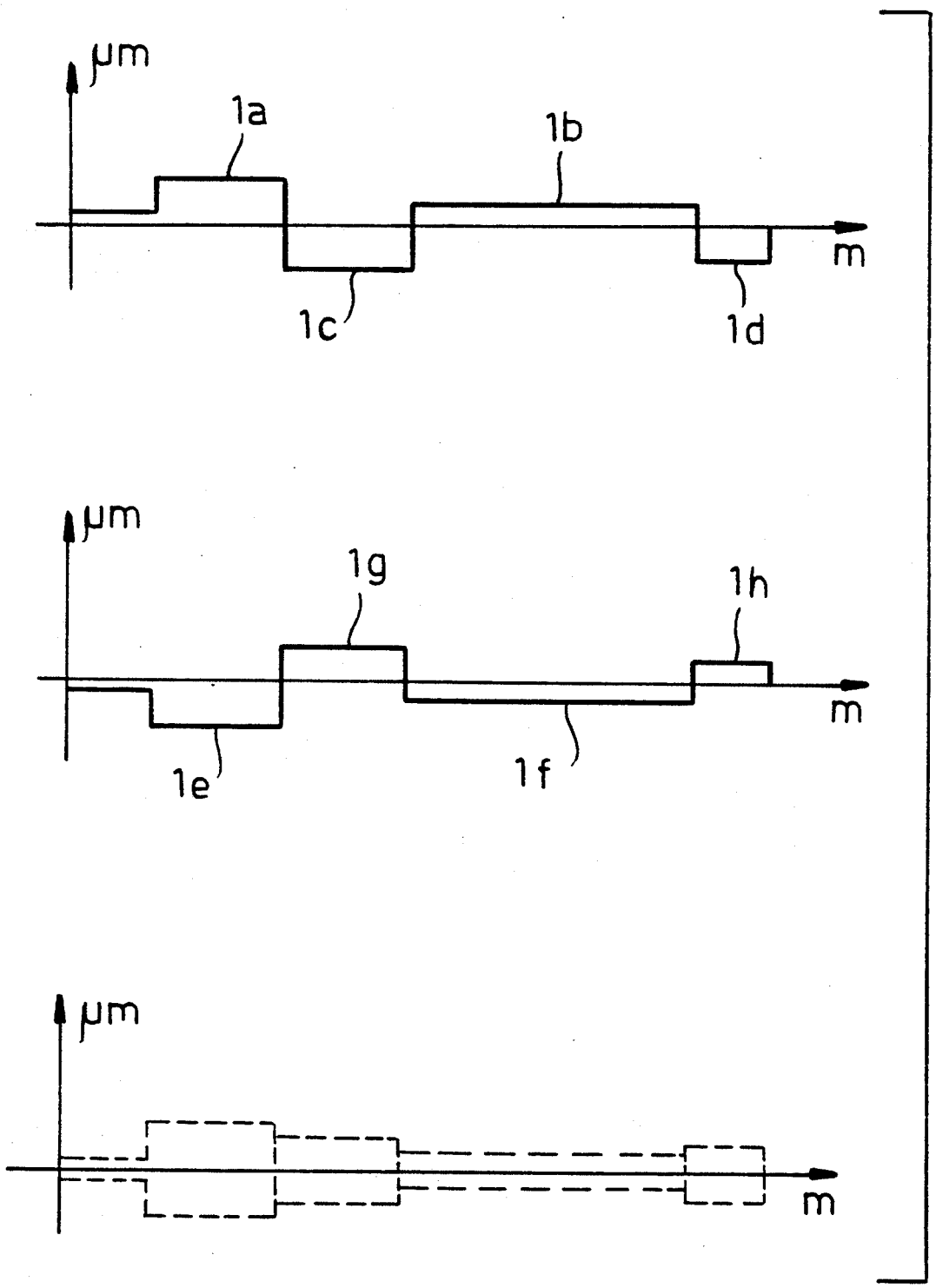
FIG. 2 is a set of graphs illustrating the principles of the invention.

FIG. 2 contains three graphs. Along the abscissa, the width of the foil is plotted in meters. Along the ordinate, the thickness errors are plotted in micrometers. The upper graph shows the thickness-error profile of the foil 1 with its systematic plus errors 1a and 1b and systematic minus errors 1c and 1d, respectively shown above and below the abscissa. After a number n of such layers has been wound onto the coil, the measuring unit 11 counting the layers, the contour measuring unit 8 signals a deviation of the contour from the cylindrical and thus the thickness-error profile of the layers which have been deposited. The computer 12 determines, by comparison with a predetermined cylindrical contour, the thickness-error profile and an inverse thickness-error profile. The inverse thickness-error profile is shown in FIG. 2 and has minus thickness errors 1e and 1f in those regions in which the original profile had plus thickness errors 1a and 1b, and plus thickness errors 1g and 1h where the original of the blowing head 4, the subsequent n layers of the inverse profile are generated and deposited on the coil so that the thickness errors cancel out (lower graph of FIG. 2) and provide a substantially level surface as represented by the abscissa in this lower graph corresponding to a truly cylindrical coil. The thickness errors thus vanish and the foil can have a sufficiently cylindrical contour at the end of the winding operation.

Figure 3A:
FIG. 3a is a diagrammatic cross sectional view greatly enlarged in scale of a portion of a web showing one thickness profile.
Figure 3B:
FIG. 3b is a section similar to FIG. 3 showing the inverse profile of the web.
Figure 3C:
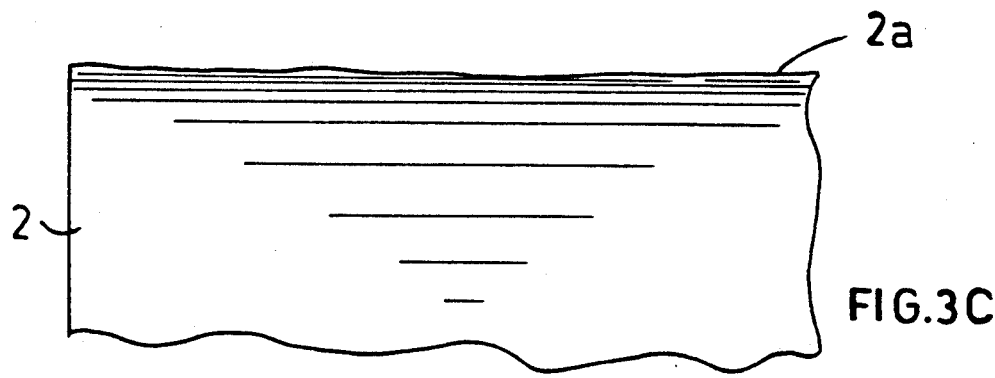
FIG. 3c is a diagram showing the cylindrical contour of the web.

As can be seen from FIGS. 3a and 3b, the successive layers 1i and 1j (FIGS. 3a and 3b, shown greatly exaggerated in thickness), can be inverses of one another and when wound in the coil 2 can ensure a truly cylindrical contour 2a thereof.

Figure 5:
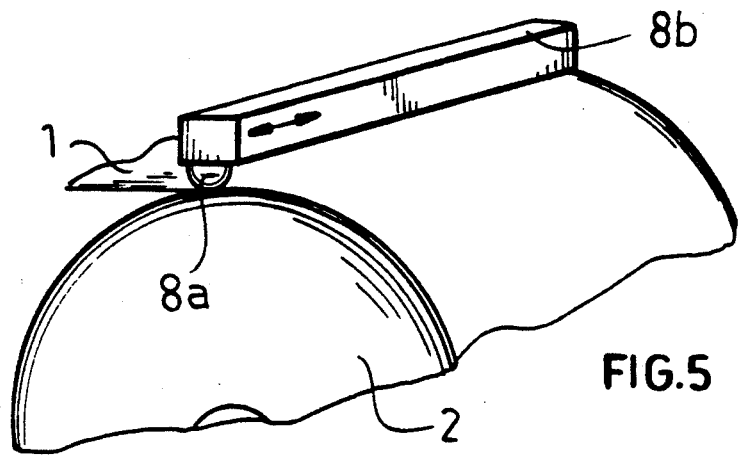
FIG. 5 is a diagrammatic perspective view illustrating a mechanical sensing of the contour of the roll or coil.

FIG. 5 shows that the coil 2 need not be scanned by a laser beam to determine the contour but can be scanned by a mechanical sensor 8a which can travel back and forth across the width of the film 1 in a track 8b to sense contour of the coil 2.

Figure 4:
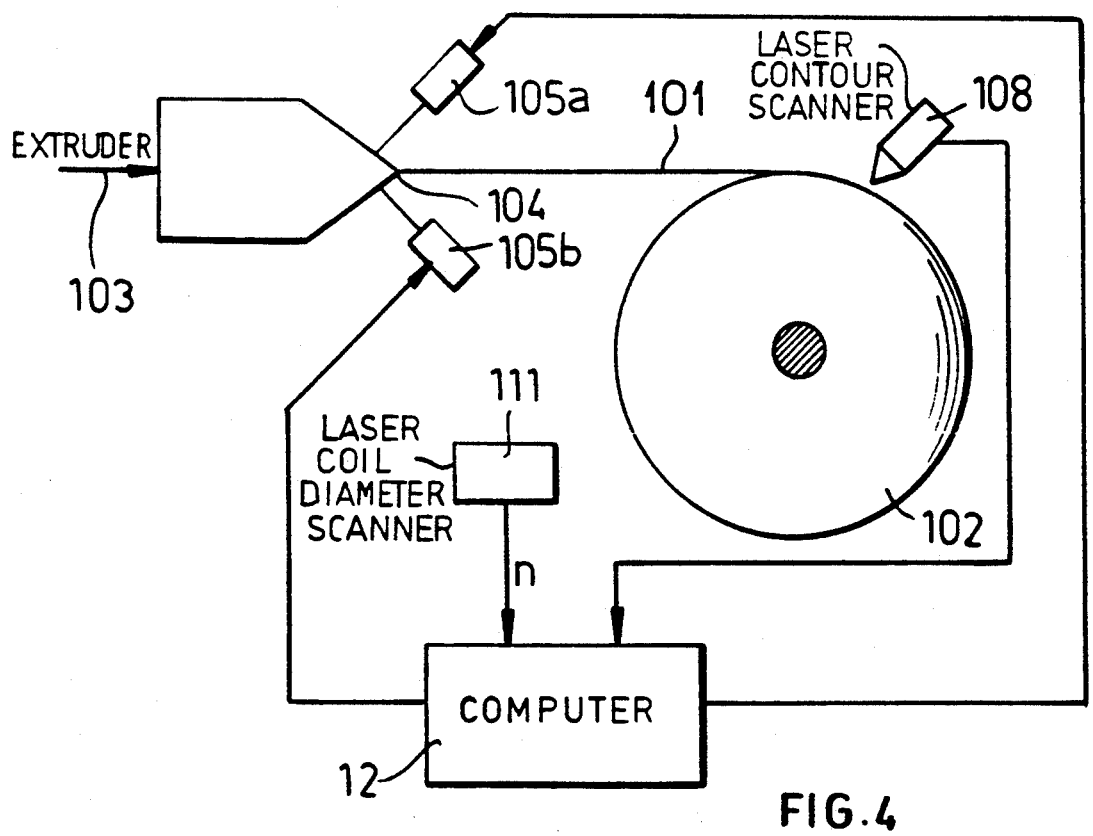
FIG. 4 is a diagram similar to FIG. 1 showing the formation of the film by a wide-slit nozzle.
Figure 6:
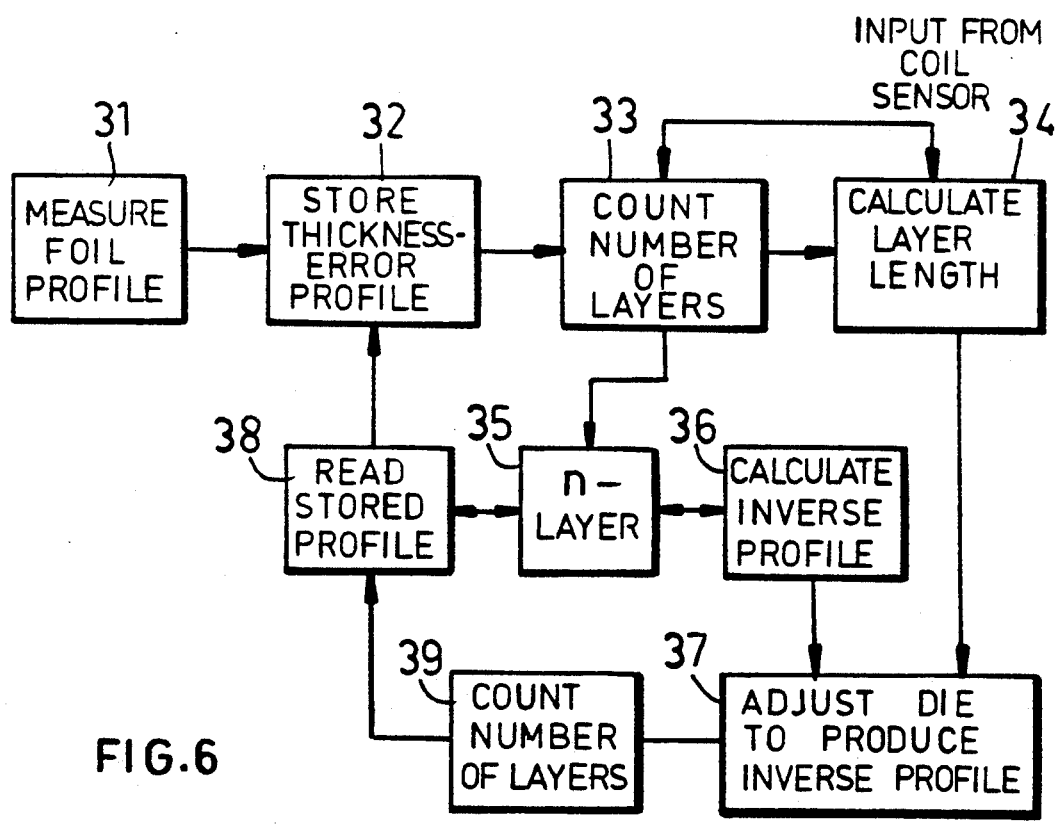
FIG. 6 is an algorithmic block diagram illustrating aspects of the method of the invention.

In FIG. 4, I have shown a wide slot nozzle 104 connected to an extruder at 103 for generating the film 101 directly, the film being wound on a coil 102 which is monitored by a laser sensor 111 providing an input to the computer 112 representing the number of turns n and by a laser coil contour scanner 108 the function of which has been described previously. In this embodiment, the computer 112 controls effectors 105a and 105b controlling the lips of the slot-like orifice from which the synthetic resin material emerges to generate the inverse thickness-error profile web. As can be seen from FIG. 6, the computer, by reason of the coil contour scan, can measure the foil profile as represented at 31 and can store the thickness-error profile at 32 as the coil is being wound, the number of layers being counted at 33 and the layer length for the layers being calculated at 34. When the count reaches a number n as represented at 35, the inverse profile is calculated at 36 and the die is adjusted to produce the inverse profile at 37 based upon the stored profile read at 38 from the memorized profile 32. The number of layers deposited of the inverse profile with respective lengths is counted at 39 and the process is repeated alternating between the application of n layers of the original thickness-error profile and n layers of the inverse profile.

I claim:

1. A method of making a coil of a plastic foil, comprising the steps of:
   (a) continuously forming a flat web of a plastic foil having over a width thereof a thickness-error profile including system-produced plus thickness errors and minus thickness errors;
   (b) winding said web into a coil;
   (c) measuring said thickness-error profile by detecting a contour of said coil and deviation of said contour from a predetermined cylindrical contour, and feeding a signal representing said thickness-error profile into a computer;
   (d) upon winding of n layers of said web onto said coil, where n is at least 1, controlling the forming of said web to generate therein an inverse thickness-error profile and winding same upon said coil in n layers; and
   (e) alternatingly winding said coil with n layers of the web with mutually inverse thickness-error profile, the method continuing until said coil is fully wound and has a substantially cylindrical contour.

2. In a process for producing a synthetic resin foil from a thermoplastic synthetic resin in which the synthetic resin foil is wound into a coil and the foil is produced with a thickness-error profile from a predetermined set point thickness with systematic thickness-plus errors and thickness-minus errors, the thickness error profile is measured, a number of layers of the foil width and the thickness-error profile are wound on the coil, an inverse thickness-error profile is determined by computer from the measured thickness-error profile which corresponds to the measured thickness-error profile or has a thickness-error amplitude different therefrom and a number of layers of the foil with the inverse thickness-error profile are wound on the coil and this sequence of steps is iterated to form the coil with a substantially cylindrical contour and without regulating the thickness of the foil to meet the set point thickness, the improvement wherein, as a measurement for the thickness-error profile, the contour of the coil on which the synthetic resin foil as wound is measured and, upon a deviation of the measured contour from a predetermined cylindrical contour, the foil with inverse thickness-error profile is wound on the coil.

* * * * *